United States Patent
Wong et al.

(10) Patent No.: US 10,447,895 B1
(45) Date of Patent: Oct. 15, 2019

(54) METHOD AND SYSTEM FOR EXPANDING AND ENHANCING COLOR GAMUT OF A DIGITAL IMAGE

(71) Applicant: TFI Digital Media Limited, Hong Kong (HK)

(72) Inventors: Hon Wah Wong, Hong Kong (HK); Hon Tung Luk, Hong Kong (HK); Chi Keung Fong, Hong Kong (HK); Yin Sze, Hong Kong (HK); Hok Kwan Cheung, Hong Kong (HK); Yiu Fai Yuen, Hong Kong (HK)

(73) Assignee: TFI Digital Media Limited, Hong Kong (HK)

( * ) Notice: Subject to any disclaimer, the term of this patent is extended or adjusted under 35 U.S.C. 154(b) by 85 days.

(21) Appl. No.: 15/936,461

(22) Filed: Mar. 27, 2018

(51) Int. Cl.
| | |
|---|---|
| G06K 9/00 | (2006.01) |
| H04N 1/60 | (2006.01) |
| G06T 5/40 | (2006.01) |
| H04N 9/64 | (2006.01) |
| G06T 5/00 | (2006.01) |

(52) U.S. Cl.
CPC .......... *H04N 1/6027* (2013.01); *G06T 5/007* (2013.01); *G06T 5/40* (2013.01); *H04N 9/643* (2013.01); *G06T 2207/10016* (2013.01); *G06T 2207/10024* (2013.01)

(58) Field of Classification Search
None
See application file for complete search history.

(56) References Cited

U.S. PATENT DOCUMENTS

| | | | | |
|---|---|---|---|---|
| 5,659,490 A * | 8/1997 | Imamura | ............... | G06T 11/001 345/589 |
| 6,226,397 B1 * | 5/2001 | Yamagata | ................. | H04N 1/56 382/162 |
| 6,720,973 B2 * | 4/2004 | Butler | .................. | H04N 1/6058 345/589 |
| 7,266,239 B2 * | 9/2007 | Akiyama | ................. | H04N 1/46 382/167 |
| 7,394,470 B2 * | 7/2008 | Nishimura | ............. | H04N 19/63 345/589 |
| 7,933,445 B2 * | 4/2011 | Pan | ....................... | G06K 9/4652 382/167 |
| 8,050,496 B2 * | 11/2011 | Pan | ....................... | G06K 9/4652 382/118 |

(Continued)

OTHER PUBLICATIONS

Skin Color region protect algorithm for color gamut extension, Gang Song Et al., JOICS, 1548-7741, 2014, pp. 1909-1916 (Year: 2014).*

(Continued)

*Primary Examiner* — Jayesh A Patel
(74) *Attorney, Agent, or Firm* — Idea Intellectual Limited; Margaret A. Burke; Sam T. Yip

(57) ABSTRACT

An intelligent method and system for expanding and enhancing the color content of video or image to a wider color gamut to make the displayed video or image more pleasing while certain important and sensitive colors such as skin colors are preserved to avoid the perception of visually unnatural image or video artifacts. With the implementation of such method and system, the merits of the wide color gamut display can be fully utilized to provide videos and images of high visual quality.

15 Claims, 4 Drawing Sheets

(56) References Cited

U.S. PATENT DOCUMENTS

| | | | |
|---|---|---|---|
| 8,238,654 B2* | 8/2012 | Pan | G09G 5/02 |
| | | | 345/593 |
| 2008/0166044 A1* | 7/2008 | Pan | G06K 9/4652 |
| | | | 382/167 |

OTHER PUBLICATIONS

Wide-Gamut Displays, Charles Poynton, Information Display, 0362-0972, 2007, pp. 10-15 (Year: 2007).*

* cited by examiner

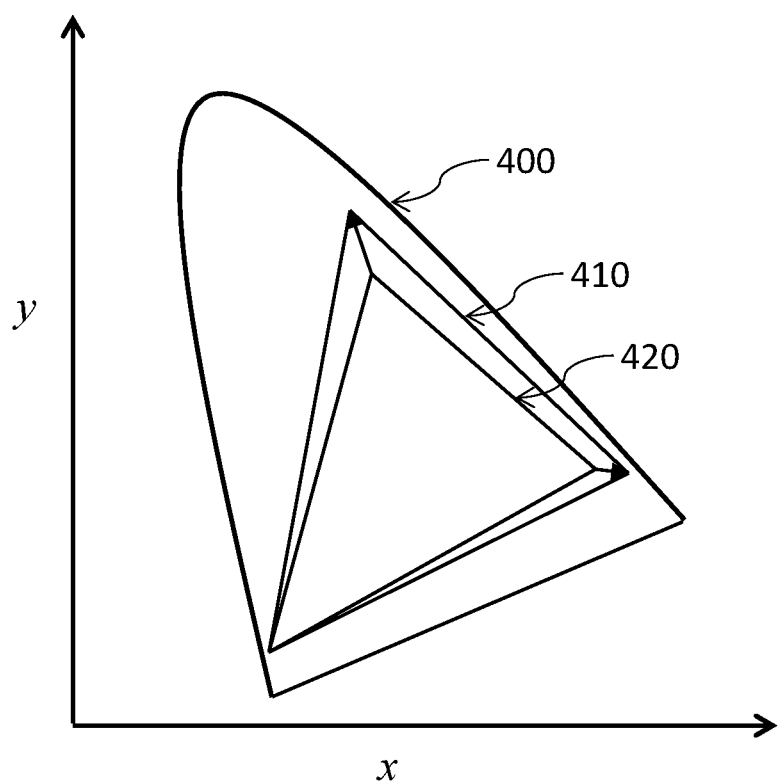
FIG. 4 (prior-art)

METHOD AND SYSTEM FOR EXPANDING AND ENHANCING COLOR GAMUT OF A DIGITAL IMAGE

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to color enhancement of digital videos and images. Particularly, the present invention relates to a method for expanding and enhancing a color gamut of a video or image content to a wider color gamut to achieve higher visual quality.

BACKGROUND

Recently, more and more wide color gamut devices such as digital camera, television, and mobile phones are developed with the standard Rec. 2020 being commonly accepted. For digital video and image contents coded in sRGB color space based on the Rec. 709 standard, which has a small color space covering only about 35.9% of the CIE 1931 color space, the colors, especially skin colors, look too vivid and unnatural when the video or image is displayed in the wider color gamut devices directly. Traditionally, this problem can be solved by first applying a transformation of the color data into the linear domain of the color pixels, and then reproducing the original color of the content in the wide color gamut devices as shown in FIG. 4. However, displaying only the sRGB color space in wide color gamut display losses the merit of the wide color gamut display.

SUMMARY OF THE INVENTION

It is an objective of the present invention to provide a method and a system for expanding and enhancing the color content of video or image to a wider color gamut to make the displayed video or image more pleasing while preserving the natural color perception on certain important and sensitive colors such as skin colors. As a result, the merits of the wide color gamut display can be fully utilized to provide videos and images of high visual quality.

In accordance to one aspect of the present invention, a method for expanding and enhancing the color gamut of an image is provided. The method comprises: accepting an input image of a first color space and accessing an input pixel color from the input image; a saturation calculation step for calculating saturation value of the input pixel color; a saturation mapping step for obtaining a modified saturation value; a skin tone detection step for calculating a skin tone index of the input pixel color; a weight index calculator for calculating a weight index for the input pixel color; a color space conversion step for transforming the input pixel color in the first color space to a preserved pixel color in the second color space; a color space extension step for extending the input pixel color in the first color space to an extended pixel color in the second color space; a color mixing step for mixing the preserved pixel color and extended pixel color to produce an output pixel color in the second color space; and a step for forming an output image in the second color space after all of the pixel colors in the input image are processed.

In accordance to one aspect of the present invention, the importance of saturation of a pixel color is controlled in such a way that the saturation of the input image is used as a weighting factor to control the mixing of the wide color gamut image and the original color image. The saturation is modified with a mapping function to ensure a pure color input will produce a pure color output such that the second color space is fully occupied. The mapping function may have a convex nature to control the level of color enhancement of the input pixel. As a result, a pixel color of lower saturation is enhanced less while a pixel color of higher saturation is enhanced more. And the natural colors of the original image are preserved.

In accordance to another aspect of the present invention, to address the artifacts, such as over saturation, induced by the direct mapping of the colors from the first color space to the second color space, and in the case that the second color space is relatively too large, the preserved color and the directly extended color may be mixed with a mixing function such that only pixel colors of large saturation are enhanced more while colors sensitive to human eye like skin colors are preserved.

BRIEF DESCRIPTION OF THE DRAWINGS

Embodiments of the invention are described in more detail hereinafter with reference to the drawings, in which:

FIG. 4 illustrates a chromatic diagram demonstrating how a small color space is directly expanded to a large color space.

DETAILED DESCRIPTION

In the following description, methods and systems for expanding and enhancing the color gamut of an image and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1:
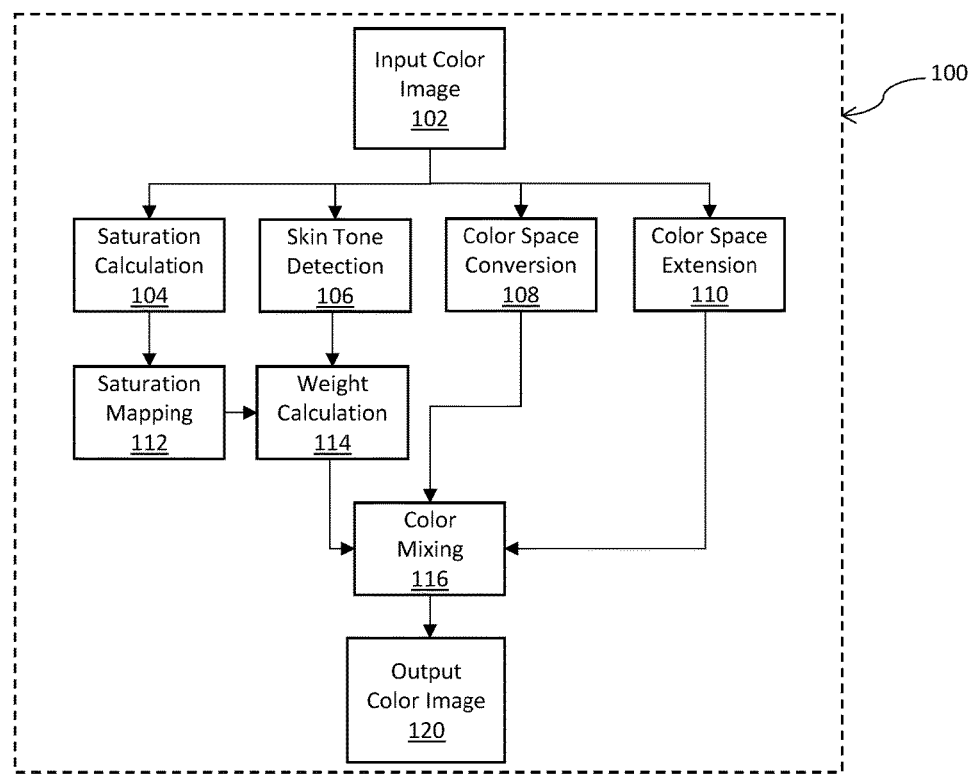
FIG. 1 illustrates a flowchart of steps of a method for expanding and enhancing the color gamut of an image in accordance with one embodiment of the present invention.

FIG. 1 illustrates a flowchart of steps of a method 100 for expanding and enhancing the color gamut of an image in accordance with a preferred embodiment of the present invention. The image may be originated from any digital video or image content coded in a device having a relatively small color space, such as the sRGB color space based on the Rec. 709 standard, which is covering only about 35.9% of the CIE 1931 color space, and to be displayed in a device of a wider color space such as the CIE 1931 color space or the next generation color space under the standard Rec. 2020.

Referring to FIG. 1. In accordance to one embodiment of the present invention, provided is the method 100, comprising: a step for receiving an input image; a color enhancement process comprising:
- a) step 102 for accessing an input pixel color, $I_1$, from the input image;
- b) step 104 for calculating saturation value, s, of the input pixel color;
- c) step 112 for obtaining a modified saturation value, $s_m$;
- d) step 106 for calculating a skin tone index of the input pixel color;
- e) step 114 for calculating a weight index, w, for the input pixel color;
- f) step 108 for transforming the input pixel color in the first color space to a preserved pixel color, $I_P$, in the second color space;
- g) step 110 for extending the input pixel color in the first color space to an extended pixel color, $I_E$, in the second color space; and
- h) step 116 for mixing the preserved pixel color and extended pixel color to produce an output pixel color, $I_2$, in the second color space;

and step 120 for forming an output image in the second color space after all pixel colors in the input image are processed.

Figure 2:
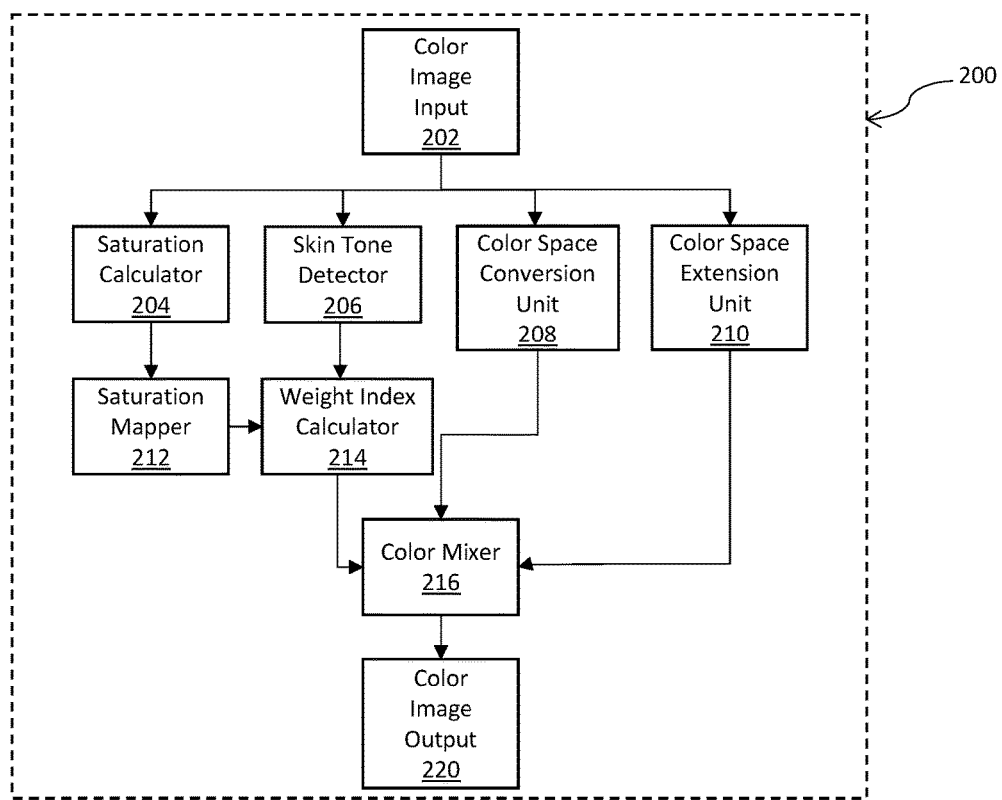
FIG. 2 illustrates a block diagram of a system for performing the method for expanding and enhancing the color gamut of an image in accordance with one embodiment of the present invention.

FIG. 2 illustrates a block diagram of a system 200 for expanding and enhancing the color gamut of an image in accordance with a preferred embodiment of the present invention. The system 200 comprises a color image input 202 for receiving an input image of a first color space and accessing an input pixel color, $I_1$, from the input image; a saturation calculator 204 for calculating saturation value, s, of the input pixel color; a saturation mapper 212 for obtaining a modified saturation value, $s_m$; a skin tone detector 206 for calculating a skin tone index of the input pixel color; a weight index calculator 214 for calculating a weight index, w, for the input pixel color; a color space conversion unit 208 for transforming the input pixel color in the first color space to a preserved pixel color, $I_P$, in the second color space; a color space extension unit 210 for extending the input pixel color in the first color space to an extended pixel color, $I_E$, in the second color space; a color mixer 216 for mixing the preserved pixel color and extended pixel color to produce an output pixel color, $I_2$, in the second color space; and a color image output 220 for producing an output image in the second color space.

In various embodiments of the present invention, the saturation value, s, is determined by the function:

$$s = 1 - \frac{\min(R_1, G_1, B_1)}{\max(R_1, G_1, B_1)}$$

where $R_1$, $B_1$ and $G_1$ are the red, blue and green color values of the input pixel color respectively. The saturation value may range from 0 to 1. A gray color pixel has a saturation value of 0 and a pure color has a saturation value of 1. In the calculation of saturation value, it is assumed $\max(R_1, G_1, B_1) > 1$.

Figure 3:
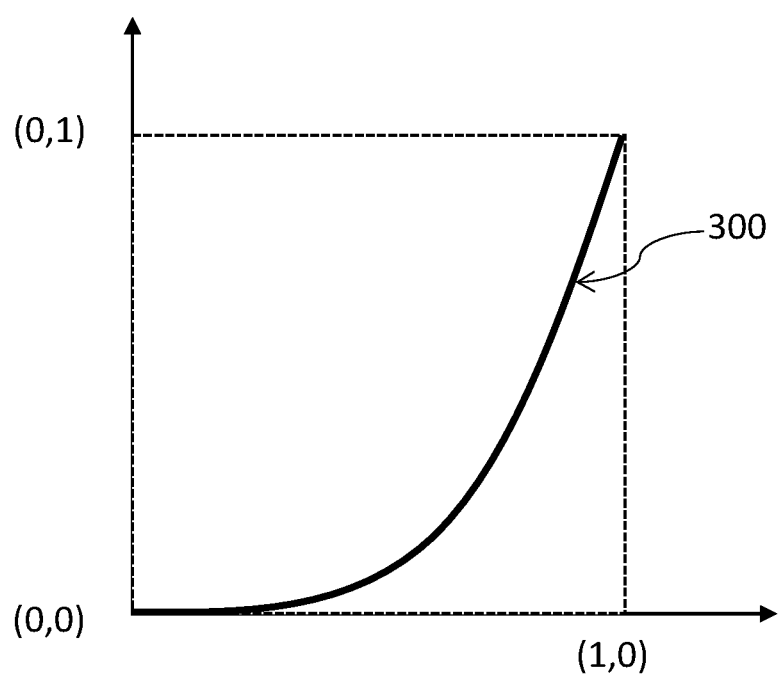
FIG. 3 illustrates a non-decreasing convex mapping curve for adjusting the importance of saturation of a pixel color in accordance with one embodiment of the present invention.

The modified saturation value, $s_m$, may be determined by mapping the saturation value, s, with a look-up table or a polynomial mapping function. In one preferred embodiment, the mapping function may be a non-deceasing convex function 300 as shown in FIG. 3 with an input ranges from 0 to 1 and an output ranges from 0 to 1. A saturation value of 0 is mapped to a modified saturation value of 0 and a saturation value of 1 is mapped to a modified saturation value of 1.

The skin tone index may be determined with a look-up table or a polynomial function. In one preferred embodiment, the function for determining the skin tone index is:

skin color index=min(max(min(skin1,skin4,skin5),0), 1);

where $$skin1 = \frac{1}{24} \times \left(R_1 - G_1 - \frac{\max(\min(G_1 - B_1, 0), 128)}{4}\right);$$

$$skin4 = \frac{R_1 \times skin2 + (255 - R_1) \times skin3}{255};$$

$$skin2 = \frac{1}{128} \times \left(230 - (R_1 - G_1) - \max\left(\frac{\max(R_1 - B_1, 0)}{2} - 20, 0\right)\right);$$

$$skin3 = (G_1)/32, \text{ and}$$

$$skin5 = (32 - (B_1 - G_1))/32.$$

$R_1$, $B_1$ and $G_1$ are the red, blue, and green color values of the pixel of the input image respectively. For an 8-bit input image, the color value of a pixel ranges from 0 to 255. The skin tone index ranges from 0 to 1, wherein a pixel color which is 100% related to skin color has a skin tone index of 1 and a pixel color which is not related to skin color, such as a pure color pixel, has a skin tone index of 0.

The weighting index, w, may be determined with a look-up table or a polynomial function. In one preferred embodiment, the function for determining the weighting index, w, is:

$w = (1 - \text{skin color index}) \times s_m$.

In some embodiments of the present invention, the preserved pixel color, $I_P$, is obtained by firstly transforming the input pixel color, $I_1$, from the first color space to the CIE 1931 XYZ domain and then transforming to the second color space with the function:

$I_P = (M_2^{-1} M_1 * I_1^\lambda)^{1/\lambda}$, where * is the matrix multiplication sign, λ is the gamma parameter and has a typical value of 2.2, $M_1$ and $M_2$ are 3×3 transformation matrices of the first color space and the second color space, respectively, and $$I_1 = \begin{bmatrix} R_1 \\ G_1 \\ B_1 \end{bmatrix}.$$

In various embodiments of the present invention, the extended pixel color, $I_E$, may be determined by firstly converting the input pixel color, $I_1$, to the logic space of the second color space and then increasing the pixel saturation to a certain level. Alternatively, the input pixel color in the first color space may be directly mapped to the extended pixel color in the second color space, that is $I_E = I_1$, as illustrated in FIG. 4. As shown in FIG. 4, the color space vertices of the first color space 420 are directly mapped onto the vertices of the second color space 410.

In some embodiments of the present invention, the output pixel color, $I_2$, is obtained by mixing the preserved pixel color, $I_P$, and the extended pixel color, $I_E$, with the weight index, w, in the mixing function:

$$I_2 = w \times I_E + (1-w) \times I_P;$$

where $$I_2 = \begin{bmatrix} R_2 \\ G_2 \\ B_2 \end{bmatrix};$$

and $R_2$, $B_2$ and $G_2$ are the red, blue and green color values of the pixel of the output image, respectively.

The method and system for expanding and enhancing the color gamut of a video or image may be implemented in high definition televisions, mobile or personal computing devices (e.g. "tablet" computer, laptop computer, and personal computer), kiosks, printers, digital cameras, scanners or photocopiers, user terminals having built-in or peripheral electronic displays, or computer processors having data connectivity to any device having built-in or peripheral electronic displays, and having image processing electronics specifically configured to execute machine instructions for performing the color expansion and enhancement processes and algorithms; wherein the specifically configured image processing electronics may comprise one or more of general purpose and specialized computing devices, computer processors, and electronic circuitries including, but not limited to, digital signal processors (DSP), application specific integrated circuits (ASIC), field programmable gate arrays (FPGA), and other programmable logic devices. The method and system may also comprise the use of and various forms of computer storage media having computer instructions or software codes stored therein which can be used to program computers or microprocessors to perform any of the processes of the present invention. The storage media includes, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for expanding the color gamut of an input image of a first color space to an output image of a second color space, wherein the color gamut of the second color space is larger than the color gamut of the first color space, comprising:
   receiving, by image processing electronics, an input image;
   a color enhancement process executed by the image processing electronics comprising:
   a) accessing an input pixel color, $I_1$, from the input image;
   b) calculating saturation value, s, of the input pixel color;
   c) obtaining a modified saturation value, $s_m$;
   d) calculating a skin tone index of the input pixel color;
   e) calculating a weight index, w, for the input pixel color;
   f) transforming the input pixel color in the first color space to a preserved pixel color, $I_P$, in the second color space;
   g) extending the input pixel color in the first color space to an extended pixel color, $I_E$, in the second color space; and
   h) mixing the preserved pixel color and extended pixel color to produce an output pixel color, $I_2$, in the second color space; and
   generating, by image processing electronics, an output image in the second color space after all pixel colors in the input image are processed in the color enhancement process.

2. The method of claim 1, wherein the saturation value, s, is determined by:

$$s = 1 - \frac{\min(R_1, G_1, B_1)}{\max(R_1, G_1, B_1)};$$

wherein $R_1$, $B_1$ and $G_1$ are the red, blue and green color values of the input pixel color respectively.

3. The method of claim 1, wherein the saturation value, s, ranges from 0 to 1 wherein a gray color pixel has a saturation value of 0 and a pure color has a saturation value of 1.

4. The method of claim 1, wherein the modified saturation value, $s_m$, is obtained by mapping the saturation value, s, with a non-deceasing convex mapping function with an input ranges from 0 to 1 and an output ranges from 0 to 1.

5. The method of claim 4, wherein a saturation value of 0 is mapped to a modified saturation value of 0 and a saturation value of 1 is mapped to a modified saturation value of 1.

6. The method of claim 1, wherein the skin tone index is determined by:

skin color index=min(max(min(skin1,skin4,skin5),0), 1);

wherein:

$$skin1 = \frac{1}{24} \times \left(R_1 - G_1 - \frac{\max(\min(G_1 - B_1, 0), 128)}{4}\right);$$

$$skin4 = \frac{R_1 \times skin2 + (255 - R_1) \times skin3}{255};$$

$$skin2 = \frac{1}{128} \times \left(230 - (R_1 - G_1) - \max\left(\frac{\max(R_1 - B_1, 0)}{2} - 20, 0\right)\right);$$

$$skin3 = (G_1)/32;$$

$$skin5 = (32 - (B_1 - G_1))/32; \text{ and}$$

$R_1$, $B_1$ and $G_1$ are the red, blue, and green color values of the pixel of the input image respectively.

7. The method of claim 6, wherein the skin tone index ranges from 0 to 1, wherein a pixel color that is 100% relating to skin color has a skin tone index of 1 and a pixel color that is not relating to skin color has a skin tone index of 0.

8. The method of claim 1, wherein the weighting index, w, is determined by:

$$w = (1 - \text{skin color index}) \times s_m,$$

where $s_m$ is the modified saturation value.

9. The method of claim 1, wherein the preserved pixel color, $I_P$, is obtained by firstly transforming the input pixel color, $I_1$, from the first color space to the CIE 1931 XYZ domain and then transforming to the second color space by:

$$I_P = (M_2^{-1} * M_1 * I_1^\lambda)^{1/\lambda},$$

where * is the matrix multiplication sign, $\lambda$ is a constant, $M_1$ and $M_2$ are 3×3 transformation matrices of the first color space and the second color space, respectively, and $$I_1 = \begin{bmatrix} R_1 \\ G_1 \\ B_1 \end{bmatrix}.$$

10. The method of claim 9, wherein $\lambda$ is equal to 2.2.

11. The method of claim 1, wherein the extended pixel color, $I_E$, is obtained by firstly converting the input pixel color, $I_1$, to the logic space of the second color space and then increasing the pixel saturation to a certain level.

12. The method of claim 1, wherein the extended pixel color, $I_E$, is obtained by directly mapping the input pixel color, $I_1$, in the first color space to the second color space.

13. The method of claim 1, wherein the output pixel color, $$I_2 = \begin{bmatrix} R_2 \\ G_2 \\ B_2 \end{bmatrix},$$

where $R_2$, $B_2$ and $G_2$ are the red, blue and green color values of the pixel of the output image respectively, is obtained by mixing the preserved pixel color, $I_P$, and the extended pixel color, $I_E$, with a mixing function:

$I_2 = w \times I_E + (1-w) \times I_P$; where $w$ is the weight index.

14. The method of claim 1, wherein the first color space is sRGB color space and the second color space is a DCI-P3.

15. A system for expanding the color gamut of an input image of a first color space to an output image of a second color space, wherein the color gamut of the second color space is larger than the color gamut of the first color space, comprising:

a color image input for receiving an input image of a first color space and accessing an input pixel color, $I_1$, from the input image;

a saturation calculator for calculating saturation value, s, of the input pixel color;

a saturation mapper for obtaining a modified saturation value, $s_m$; a skin tone detector for calculating a skin tone index of the input pixel color;

a weight index calculator for calculating a weight index, w, for the input pixel color;

a color space conversion unit for transforming the input pixel color in the first color space to a preserved pixel color, $I_P$, in the second color space;

a color space extension unit for extending the input pixel color in the first color space to an extended pixel color, $I_E$, in the second color space;

a color mixer for mixing the preserved pixel color and extended pixel color to produce an output pixel color, $I_2$, in the second color space; and a color image output for producing an output image in the second color space after all pixel color in the input image are processed.

* * * * *